(12) United States Patent
Volpe et al.

(10) Patent No.: US 10,074,401 B1
(45) Date of Patent: Sep. 11, 2018

(54) ADJUSTING PLAYBACK OF IMAGES USING SENSOR DATA

(71) Applicant: Amazon Technologies, Inc., Reno, NV (US)

(72) Inventors: Jason Volpe, Seattle, WA (US); Jonathan Edward Suchland, Seattle, WA (US); Kadirvelu Rathnavelu, Seattle, WA (US); Samir Raj Hege, Seattle, WA (US); Neal Flaherty, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/485,410

(22) Filed: Sep. 12, 2014

(51) Int. Cl.
| | | |
|---|---|---|
| *G11B 27/11* | (2006.01) | |
| *G11B 31/00* | (2006.01) | |
| *G11B 27/00* | (2006.01) | |
| *H04N 9/80* | (2006.01) | |

(52) U.S. Cl.
CPC ............ *G11B 27/11* (2013.01); *G11B 27/005* (2013.01); *G11B 31/006* (2013.01); *H04N 9/80* (2013.01)

(58) Field of Classification Search
CPC ........ H04N 5/772; H04N 9/80; G11B 27/105; G11B 27/11; G11B 27/005; G11B 31/006; A63F 13/10
USPC .............. 386/223–224, 239, 241; 463/31, 32
See application file for complete search history.

(56) References Cited

U.S. PATENT DOCUMENTS

| | | | | |
|---|---|---|---|---|
| 7,447,418 B2* | 11/2008 | Nishio | ............. | G06F 17/30259 |
| | | | | 348/E5.042 |
| 8,948,788 B2* | 2/2015 | Conway | ................ | G06F 1/1624 |
| | | | | 345/685 |
| 9,262,999 B1* | 2/2016 | Froment | ................. | G06F 3/017 |
| 9,274,597 B1* | 3/2016 | Karakotsios | .......... | G06F 3/0346 |
| 9,654,762 B2* | 5/2017 | Xu | ........ | H04N 13/221 |
| 2001/0007469 A1* | 7/2001 | Fuchimukai | ........... | H04N 5/772 |
| | | | | 348/208.99 |
| 2004/0029636 A1* | 2/2004 | Wells | ................... | G07F 17/3211 |
| | | | | 463/32 |
| 2005/0168612 A1* | 8/2005 | Koppetz | .............. | H04N 5/2224 |
| | | | | 348/333.09 |
| 2006/0189902 A1* | 8/2006 | Takai | ..................... | G11B 19/08 |
| | | | | 600/595 |
| 2006/0223635 A1* | 10/2006 | Rosenberg | .............. | A63F 13/10 |
| | | | | 463/37 |
| 2009/0091710 A1* | 4/2009 | Huebner | ................ | G03B 21/14 |
| | | | | 353/28 |
| 2009/0195351 A1* | 8/2009 | Takeda | .................... | H04N 7/163 |
| | | | | 340/5.1 |
| 2009/0197635 A1* | 8/2009 | Kim | ....................... | G06F 3/0346 |
| | | | | 455/550.1 |
| 2009/0284463 A1* | 11/2009 | Morimoto | ............. | G06F 1/1616 |
| | | | | 345/156 |

(Continued)

*Primary Examiner* — Mishawn Hunter
(74) *Attorney, Agent, or Firm* — Lee & Hayes, PLLC

(57) ABSTRACT

Technologies are described herein for capturing a sequence of images and for capturing sensor data at or around the time the images are captured. The sensor data is associated with the sequence of images. During a playback time of the images, additional sensor data is captured. The playback of the images is based at least, in part, on a correlation between movement indicated by the sensor data that was captured at the capture time of the images and movement indicated by the additional sensor data that is captured at the playback time.

20 Claims, 8 Drawing Sheets

(56) References Cited

U.S. PATENT DOCUMENTS

| | | | | |
|---|---|---|---|---|
| 2011/0074671 | A1* | 3/2011 | Shimosato | H04N 5/23293 345/156 |
| 2011/0102556 | A1* | 5/2011 | Kim | H04N 1/00307 348/51 |
| 2011/0244956 | A1* | 10/2011 | Sakakibara | A63F 13/06 463/31 |
| 2012/0320148 | A1* | 12/2012 | Unger | H04N 5/23238 348/36 |
| 2013/0101163 | A1* | 4/2013 | Gupta | G06K 9/00671 382/103 |
| 2013/0194421 | A1* | 8/2013 | Kita | H04N 7/18 348/143 |
| 2014/0179369 | A1* | 6/2014 | Han | H04M 1/0202 455/556.1 |
| 2014/0354534 | A1* | 12/2014 | Mullins | G06F 3/015 345/156 |
| 2014/0369563 | A1* | 12/2014 | Kalevo | H04N 5/232 382/103 |

\* cited by examiner

US 10,074,401 B1

ADJUSTING PLAYBACK OF IMAGES USING SENSOR DATA

BACKGROUND

Today, users take and share pictures from a variety of different computing devices. For example, a user may take pictures with a portable computing device, such as a smartphone, a tablet or a camera. Many devices that capture images may be used to capture a single image, a burst of images or record a video. In some cases, the user may view the images taken on the device, or shared by another user, directly on the device that captured the images.

When viewing a sequence of images, the images might be displayed in response to a user selecting a user interface element to display the next or previous image or the images might be automatically shown. For example, each image in a sequence might be displayed for some period before the next image in the sequence is displayed. In other examples, a user might change the images displayed using a gesture (e.g., perform a swipe to the left or the right). The user viewing the sequence of images, however, may be limited in how they navigate the images. For example, the user may have to select a user interface element to either select another image for viewing or to move forward or backward in the sequence of images.

The disclosure made herein is presented with respect to these and other considerations.

DETAILED DESCRIPTION

Figure 1:
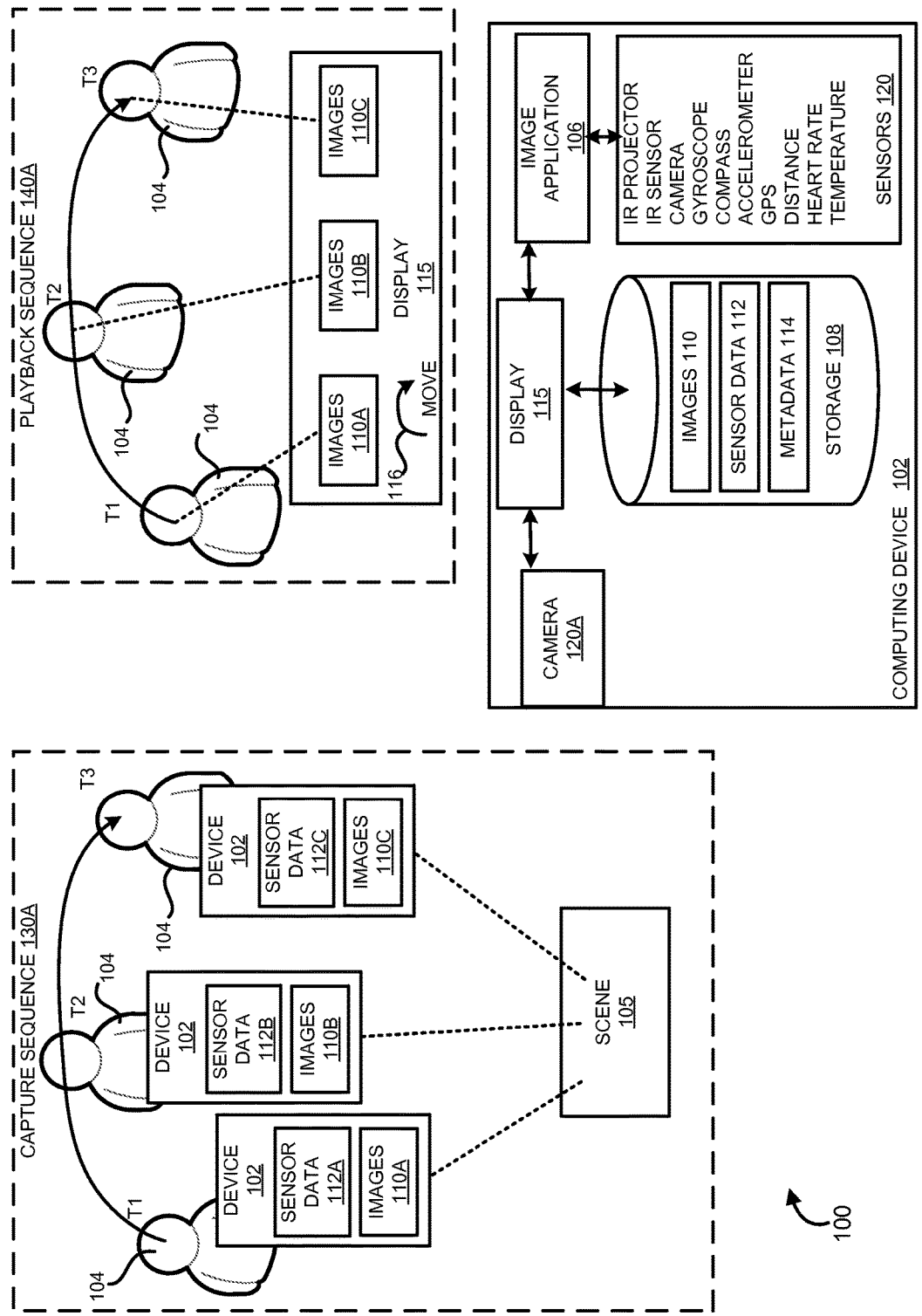
FIG. 1 is a system diagram showing an illustrative operating environment for capturing sensor data and a sequence of images, and for playing back the images when current sensor data correlates to the captured sensor data.

The following detailed description is directed to technologies for adjusting playback of images using sensor data. Utilizing the technologies described herein, a user may record a sequence of images along with sensor data that may be used during a playback of the images. In some examples, sensor data obtained during the playback of the images may be used when determining the images to display.

In some examples, a camera captures a sequence of images (e.g., 10, 20, or 30) in response to a user selecting a user interface ("UI") element or selecting a hardware interface (e.g., a button). Each image may be associated with sensor data that is captured at the time the image is taken. For example, the sensor data might be captured at the time that each image is captured, or continuously captured during the capture time of the sequence of images. Continuously capturing the sensor data during the capture time of the images might provide a better indication of the movement of the device or the user during the capture time.

The sensor data that is captured might include different types of sensor data. For example, the sensor data that is captured might include location data, orientation data, movement or acceleration data, biological data, environmental data, sound data, a time the images were captured, and the like. The sensor data might be related to the device and/or a user that is capturing the images or playing back the images. The sensor data might be captured using sensors such as, but not limited to one or more global positioning system ("GPS") sensors, gyroscopes or some other type of orientation sensors, acceleration sensors, infrared sensors, camera sensors, distance sensors, and the like. In some examples, the sensor data might be obtained from other devices. For example, a heart monitor might provide pulse data and/or other data.

Generally, the sensor data may be used to determine how the images are being captured. For example, the sensor data might be analyzed to determine whether the user is walking around an object, walking toward or away from an object, panning the camera, tilting the camera, zooming the camera (e.g., virtual movement), or the like. The sensor data might also be used to determine what the user is looking at while taking the images. For example, the sensor data might indicate whether the user was looking to the left, to the right, or up or down while the images were being captured. A relative movement of the camera to the user might also be determined during the capture time. For example, the sensor data may indicate whether the user was moving the camera closer to himself/herself or away from himself/herself during the capture time. The sensor data might also be used to determine the pulse rate of the user, current weather conditions, a direction the user is moving (e.g., using a compass), and the like.

In some configurations, the sensor data may be used during the time of capture to adjust different parameters of the camera. For example, a frame rate of the camera might be increased when the sensor data indicates that the user is moving quickly, when the pulse of the user increases, or the like. Similarly, the frame rate might be decreased when the user slows down or the pulse rate decreases. In other configurations, the sensor data obtained at the image capture time may be used to change a number of images stored during a particular time. For example, more images may be included during a time the user is moving quickly and fewer images may be stored when the user is moving slowly.

The captured sensor data may be associated with images individually or be associated with a sequence of images. In some configurations, metadata is generated that is associated with the sequence of images captured during a capture time. The metadata might indicate a path of movement of the capture device or the user during the capture time. The metadata might be stored as part of an image file or separately from the images. The sensor data may be analyzed by an image application, or some other device or component, to determine the movements, if any, associated with the device or the user during the capture time.

In some configurations, different types of image processing operations might be performed on the images. For example, the images might be aligned such that one or more objects that are in the image are aligned from one image to a next image (e.g., when the images are overlaid, the object is in the same or a similar position in each image). Image stabilization, color leveling or other image processing mechanisms might also be utilized. As briefly discussed above, the number of images that are associated with a particular time period might also be changed.

At some point, the user, or some other user might start a playback of the captured images. The playback of the images is based at least, in part on the captured sensor data. For example, the playback may be displayed more quickly in portions where the user was moving faster when capturing the images and may be displayed slower in portions where the user is moving slowly when capturing images.

In some examples, the playback of the images is based at least, in part on the sensor data obtained during the capture of the images and current sensor data that is obtained during the playback. For example, the sensor data captured during the capture of the images may indicate that the user was walking toward an object. To playback the sequence of images captured when the user was walking toward the object, the user might walk forward to move forward in the sequence of images, or walk backwards to move back in the sequence of images. The user might also move the phone away from himself/herself to move forward in the sequence of images or move the phone toward himself/herself to move back in the sequence of images. The correlation between the movements at capture time with the movement during playback might be a one-to-one correlation or some other correlation. For example, movement at playback time in the same or similar direction as during capture time may be used to move through a sequence of images.

The playback of a sequence of images might also be affected based upon the direction that the user is looking during playback. For example, if the user is looking toward the left side or the right side of the device, then the content may be panned to the left or to the right. Detecting that the user is looking left to right may be correlated at playback time with the panning from the left to right that was used to capture the images. In other configurations, a previous playback might be used by another viewer when viewing the playback. For example, a playback recorded by a user may be shared with other users such that the other users view the playback in the same manner as the user who recorded the playback. Additional details regarding the various components and processes described above for using sensor data captured during a capture time of images to determine a playback of images will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable customer electronics, minicomputers, mainframe computers, hand-held computers, personal digital assistants, e-readers, cellular telephone devices, special-purposed hardware devices, network appliances, and the like. As mentioned briefly above, the technologies described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system diagram showing an illustrative operating environment 100 for capturing sensor data and a sequence of images, and for playing back the images when current sensor data correlates to the captured sensor data. The environment 100 includes a computing device 102 utilized by a user 104 to capture images 110 and sensor data 112, and to playback the images 110 using sensor data 112 that was obtained at the time of capture of the images 110. In some configurations sensor data 112 obtained at a time of the playback may be used to adjust the playback of the images. The computing device 102 may be a smartphone, a tablet, or any other computing device capable of performing the technologies described herein. The computing device 102 might execute a number of software modules in order to perform operations described herein. The modules may consist of a number of subcomponents executing on different one or more computing devices.

The user 104 may be an individual who captures images 110 (e.g., takes pictures) or views the captured images 110. The user 104 may use an application program executing on the computing device 102, such as an image application 106, to capture the images 110, the sensor data 112 and to playback the images 110 on a display 115.

The user 104 might initiate a capture of images 110 by pressing a physical actuator (not shown) on the computing device 102, selecting a UI element associated with the image application 106, or performing some other action (e.g., speech, gesture). The image application 106 may capture images using an image capture device, such as the camera 120A, which may be capable of recording single still images, sequences of still images, and/or video. While only one camera 120A is shown, the computing device 102 may be configured with more than one camera in some configurations (e.g., 2, 3, or 4). In some examples, the camera 120A may be operative to capture two-dimensional ("2D") or three-dimensional ("3D") images, 2D or 3D videos, and the like.

The image application 106 may have access to storage 108 that may store image data, such as the images 110, the sensor data 112 and metadata 114. In some examples, the images 110 and/or other data might be stored in a network data store (not shown). The images 110 might include different sequences of images that include a specified number of images 110. In some configurations, the camera 120 is configured to capture a certain number of images in per second (e.g., 10, 20, 30). In some examples, the image application 106 may cause the camera 120A to change the frame rate and take more or fewer images per second (e.g., 2, 5, or 20 per second) depending on the sensor data 112. As discussed above, the image application 106 may cause the camera 120A to increase or decrease the frame rate in response to a change in sensor data (e.g., pulse rate or acceleration). In other configurations, the camera 120 may take video (e.g., 30 images/sec, 60 images/sec).

The computing device 102 may include a number of different types of sensors 120. For example, the computing device 102, might include sensors such as, but not limited to one or more GPS sensors, compasses, gyroscopes or some other type of orientation sensors, acceleration sensors, infrared sensors, infrared projectors, heart rate sensors, temperature sensors, humidity sensors, altitude sensors, camera sensors, distance sensors, and the like. In some configurations, the image application 106 may activate/deactivate the sensors 120. The image application 106 may also be configured to access the sensor data 112 generated by one or more of the sensors 120.

As discussed briefly above, the user 104 may record a sequence of images 110 along with the sensor data 112. All or a portion of the images 110 may be associated with the sensor data 112, which is captured at the time the images 110 are taken (which may be referred to herein as "image capture sensor data"). For example, the sensor data 112 might be captured at the time that each image is captured, or may be continuously captured during the capture time of a sequence of the images 110. In some configurations, the sensor data 112 may be continuously captured between the time that the user 104 starts capturing the images 110 and the time when the user 104 stops capturing the images 110. Continuous capture of the sensor data 112 in this manner might provide a better indication of the movement of the device 120 and/or the user 104 during the time the images 110 are being captured (which may be referred to herein as the "capture time").

The sensor data 112 that is captured during the capture time of the images 110 might include different types of sensor data. For example, the sensor data that is captured might include location data, orientation data, movement data, biological data, environmental data, sound data, and the like. The location data might include any data that indicates a geographical position of the device 102 and/or the user capturing the images or playing back the images. For example, the location data might include GPS coordinates. The orientation data might include any data that indicates the relative physical position of the device 102, or the user, of how the device 102 is placed in a two-dimensional or three-dimensional space. The orientation data might include one or more angles of rotation (e.g., tilt angle, pan angle) of the device 102 of the user in relation a predefined reference frame. In some examples, the orientation data may identify an orientation of a head of a user capturing the images 110 or playing back the images 110 in relation to the device 102. The movement data might include any data that indicates a movement of the device 102 of the user, such as but not limited to an acceleration of the device 102 or the user. The biological data might include data relating to the health of the user such as heart rate (e.g., pulse), body temperature, and the like. The environmental data might include data such as temperature, wind, barometric pressure, and the like. The sound data might include any sound that might be recorded by the device 102. The sensor data 112 might be captured by the sensors 120 that are part of the computing device 120 and/or obtained from one or more other computing devices (not shown). For example, a heart rate monitor might provide sensor data 112 to the computing device 120.

The sensor data 112 might describe attributes of the device 102 (e.g., location or orientation), the user 104 that is capturing the images 110 (e.g., location or orientation), or the scene 105 (e.g., a distance to one or more objects in the scene 105). In some examples, the sensor data 112 includes the physical location of the user 104 and the device 102.

Figure 2:
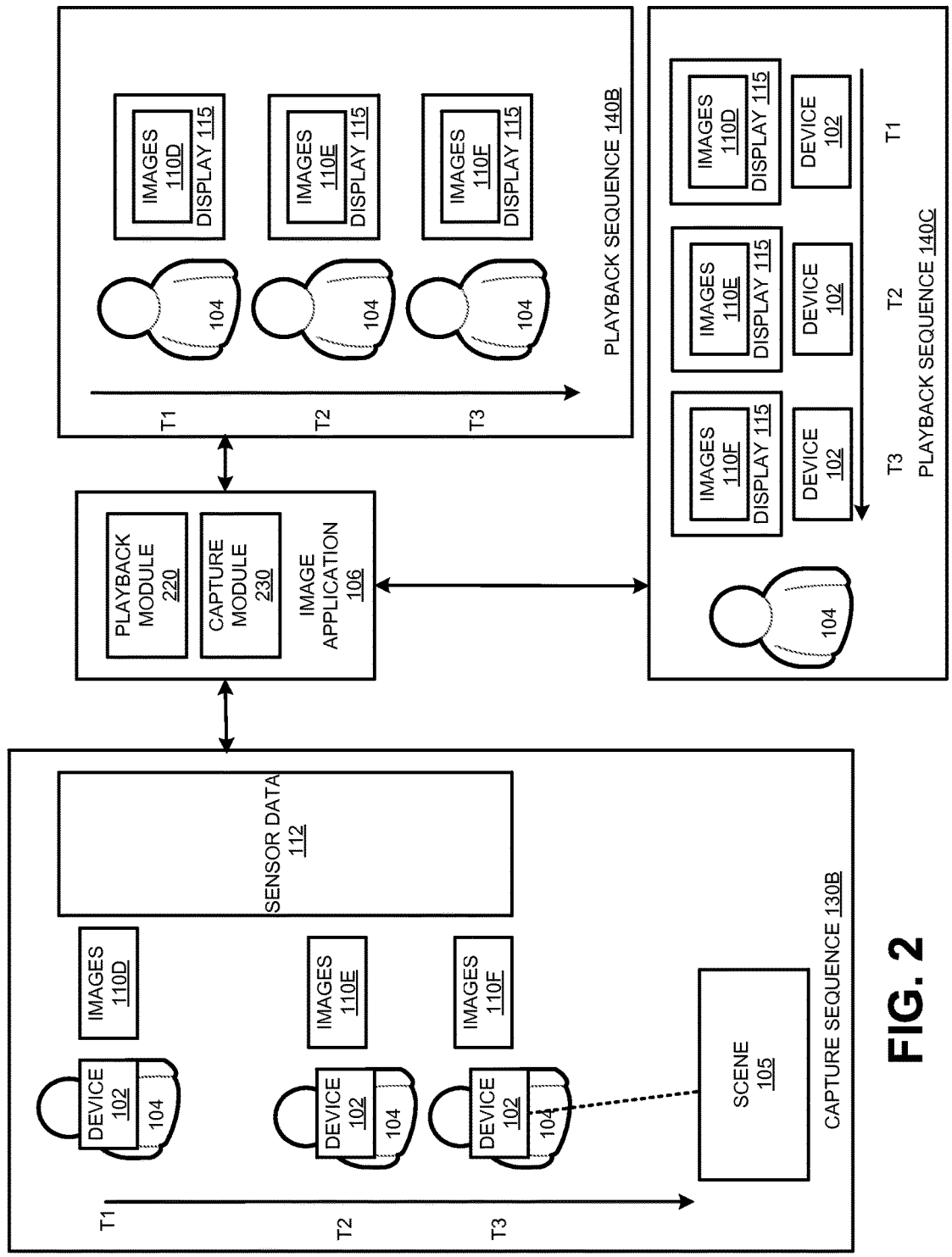
FIG. 2 is a diagram showing an example capture sequence and two playback sequences.
Figure 3:
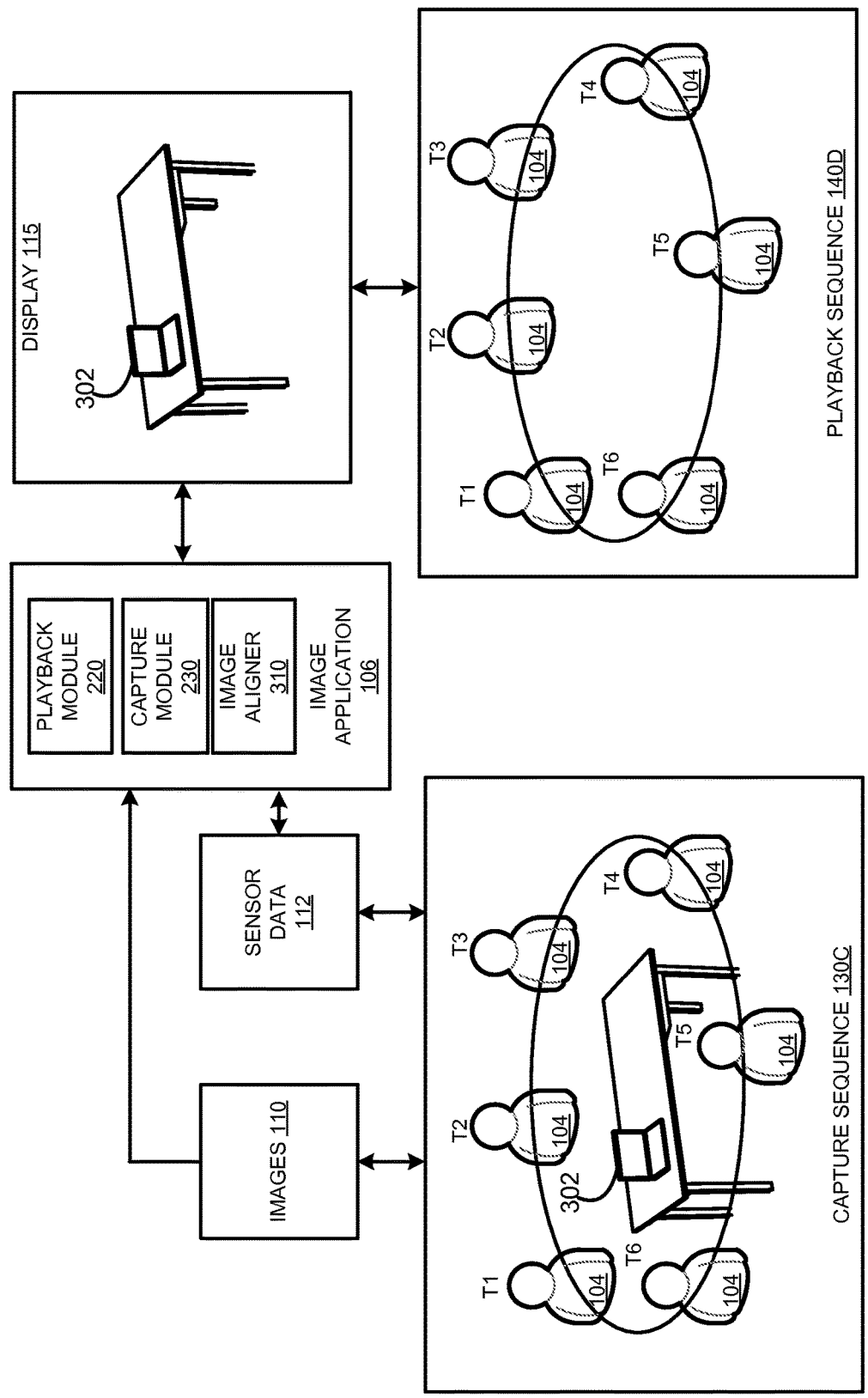
FIG. 3 is a diagram showing an example capture sequence wherein a user is walking around an object and an associated playback sequence.

As illustrated in a capture sequence 130A, the user 104 may capture images 110 and the sensor data 112 from time T1-T3. In the current example, the user at time T1 captures the images 110A of the scene 105 and the sensor data 112A using the device 102. At time T2, the user 104 captures the images 110B of a scene 105 and the sensor data 112B using the device 102. At time T3, the user 104 captures the images 110C of the scene 105 and the sensor data 112C using the device 102. As can be seen in the capture sequence 130A, the user 104 moves in an arc while capturing the images 110A-110C in the example shown in FIG. 1. In other examples, the user 104 may capture more or fewer images 110 and/or move in a different pattern (or move the device 102 while capturing images). FIG. 2 and FIG. 3 provide more examples illustrating capturing the images 110 and playing back the images 110.

The captured sensor data, such as the sensor data 112A-112C may be associated with all or a portion of the images 110A-110C. As discussed above, the sensor data 112A-112C may be continuously captured or captured during the time an image is taken. In some configurations, the image application 106 generates metadata 114 that may indicate the association between the sensor data 112A-112C and the corresponding images 110A-110C. The metadata might include a variety of different data. For example, the metadata might include user data that defines position information associated with the user (e.g., head position and/or orientation, hand positions and/or orientation or global coordinates for the user), device data defining information about the device 102 (e.g., location data, orientation data, movement data), scene data that defines information about the scene 105 (e.g., objects in the scene, depth of objects in the scene or movement of objects in the scene), and the like.

In some configurations, the position of the head, or other body parts, of the user, or some other user may be determined using a facial-recognition mechanism and tracking technology. For example, sensors, such as infrared sensors, located on the device 120 (e.g., at four corners on the device 102) might measure a head position of a user utilizing the device 102 several times per second. The measurements might indicate the position of the head relative to the center of the device in three dimensions, as well as one or more angles of the head to the left or right, or up or down.

The metadata 114 might indicate a path of movement of the capture device or the user during the capture time (e.g., the arc in the capture sequence 130A). The metadata might include other data associated with the images 110 or the sensor data 112. For example, the metadata might include a time associated with the capture of the images, or some other data. The metadata 114 might be stored as part of the image files storing the images 110 or separately from the images 110. For example, the metadata 114 may be stored in the storage 108.

In some configurations, the image application 106 analyzes the captured sensor data 112 to determine the manner in which the user or the device was moving during the capture sequence 130A. For example, the sensor data 112A-112C may be analyzed by the image application 106, or some other device or module, to determine the movement, if any, associated with the device 102 and/or the user 104 during the capture time.

Generally, the sensor data 112A-112C may be used by the image application 106 to determine how the images 110A-110C were captured. In the example shown in FIG. 1, for instance, the image application 106 may determine from the sensor data 112A-112C that the user walked in an arc while capturing the images 110A-110C. In other examples, the sensor data 112 might indicate that the user 104 walked around an object, walked toward or away from an object, panned the camera 120A, tilted the device 102, zoomed the camera 120A (e.g., virtual movement), or performed other types of movements during capture time.

In some examples, the sensor data 112 might also be used to determine the direction in which the user 104 was looking while taking the images. For example, the sensor may determine whether the user is looking toward the left, to the right, up or down while the images 110 are being captured. A relative movement of the camera 120A or the device 102 by the user 104 might also be determined during the capture time. For example, the sensor may determine whether the user 104 is moving the camera 120A closer to himself/herself or away from himself/herself during the capture time.

In some configurations, different types of image processing operations might also be performed on the images 110 by the image application 106 during capture time or after capture. For example, the image application 106 might align two or more of the images 110 such that one or more objects that are in the image are aligned from one image to a next image (See FIG. 3 for an illustrative example). In some examples, the image application 106 may display a semi-opaque frame, or a portion of the frame, of a previously captured image to serve as a guide to the user for image alignment. Other types of image processing operations that might be performed include, but are not limited to image stabilization, color leveling or the like.

After capturing the images 110 and associating the sensor data 112 captured during the capture time with the images 110, the user 104, or some other user, might start a playback sequence 140A of the captured images on the display 115 or some other display. In some configurations, the user 104 might select another display (not shown) on which to display the images 110 during the playback sequence 140. For example, the user might select a display that may be associated with a set top box, or some other computing device. In some examples, the playback of the images 110 is based at least, in part on a correlation between the captured sensor data 112 obtained during the capture of the images and sensor data that is obtained during the playback (which may be referred to herein as "playback sensor data"). For example, the sensor data 112A-112C captured during the capture sequence 130A indicates that the user is walking in an arc in a similar fashion as during capture of the images 110.

To playback the images 110 captured during the capture sequence 130A, the user 104 might move from left to right in an arc to move forward in the sequence of the images 110. For instance, the user 104 might move from right to left in an arc to move backward in the sequence of the images 110. In some examples, the playback of the images 110 might be modified in response to additional movements. For example, the user 104 might move the computing device 102 away from himself/herself to zoom out and move the computing device 102 toward himself/herself to zoom in on the images 110 during the playback. The user 104 might alternately walk forward or backward to zoom into and out of the image. Other types of movements might also modify playback of the images 110.

As illustrated in FIG. 1, the correlation between the movements made during the capture sequence 130A might be a one-to-one correlation with the movements made during the playback sequence 140A. In other examples, some other correlation may be used (e.g., see FIG. 2 and FIG. 3). According to some configurations, a movement of the user 104 or the computing device 102 during playback in the same direction as made during capture time may be used to move through the images 110 during the playback sequence. In some examples, a graphical UI element, such as a move UI element 116, may be displayed on the display 115 to indicate to the user 104 the nature of the motion that is to be used to navigate through the images 110 of playback sequence 140A.

FIG. 2 shows an example capture sequence 130B and two playback sequences 140B and 104C. As shown in FIG. 2, the image application 106 includes a playback module 220 and a capture module 230. The capture module 230 may be configured to perform operations relating to the capturing of the images 110 and the sensor data 112 during a capture sequence, such as the capture sequence 130B. The playback module 220 may be configured to perform operations relating to the playback of the images 110 during a playback sequence, such as the playback sequence 140B.

During the capture sequence 130B, the device 102, utilizing the capture module 230, may capture the images 110D-110F and the sensor data 112 as the user 104 is moving toward the scene 105. The capture module 230 may be used in capturing the images 110D-110F and the sensor data 112. In the example shown in FIG. 2, the user at time T1 utilizes the device 102 to capture the images 110D of the scene 105 and the sensor data 112. At time T2, the user 104 utilizes the device 102 to capture the images 110E of the scene 105 and the sensor data 112. At time T3, the user 104 utilizes the device 102 to capture the images 110F of the scene 105 and the sensor data 112. In some examples, the frame rate of the image capture device may be changed in response to the sensor data 112. For instance, during time T1 to T2 the frame rate might be increased in response to detecting that the user 104 is running and decreased in respond to detecting that the user 104 has slowed down.

In the example shown in FIG. 2, the sensor data 112 is continuously being collected. As discussed briefly above, continuously captured sensor data might provide a more accurate representation of the movement during the capture sequence 130B as compared to discretely capturing sensor data only at the time an image is captured. In some examples, the display 115 may include a semi-transparent image (e.g., of an object or a previous frame 110) such that the user 104 may align the images 110 that are being captured.

As can be seen by referring to the capture sequence 130B, the user 104 moves in a generally straight line toward the scene 105 during the illustrative capture sequence 130B. In other examples, the user 104 may remain generally stationary and perform a zoom operation utilizing the device 102 to zoom into the scene 105 to create the images 110D-110F captured during the capture sequence 130B.

To play back the images 110 captured during the capture sequence 130B, the user 104 might move forward to cause the playback module 220 to move forward in the sequence of the images 110D-110F as indicated by the playback sequence 140B. The user 104 might move backward to cause the playback module 220 to move backward in the sequence of the images 110D-110F. As discussed above, other types of movements might also correlate to the movement detected during the capture sequence 130B.

The playback sequence 140C illustrates another correlation that might be used to navigate the images 110D-110F. For example, the user 104 might move the device toward them to move forward in the sequence of the images 110D-110F. The user 104 might move the device 102 away from them to move backward in the sequence of the images 110D-110F. As discussed above, the playback might be modified in various ways in response to additional movements. For example, the user 104 might pan or tilt the computing device 102 to change the objects in the images that are currently displayed.

In other configurations, the playback might be adjusted based on the sensor data 112 obtained at the capture time of the images without using sensor data obtained during the playback. For example, more images might be displayed during a time the images were captured when the pulse rate was higher for a user and fewer images might be displayed during a time the pulse rate of the user was lower.

In some configurations, the playback module 220 is configured to record a playback. For example, the playback sequence 140B might be recorded by a user. The user may then playback the recorded playback and/or share the playback with other users such that they may view the playback.

FIG. 3 shows an example capture sequence 130C wherein a user 104 is walking around an object 302 and an associated playback sequence 140D. In the example shown in FIG. 3, the image application 106 also includes an image aligner 310. The image aligner 310 may perform image-processing operations that align two or more images. As discussed above, the images might be aligned such that one or more objects that are in the scene 105 are aligned from one image to a next image. The image aligner 310 may align the images 110 during a capture sequence, such as the capture sequence 130C, or at some other point (e.g., before or during the playback sequence 140).

During the capture sequence 130C, the user 104 may capture the images 110 and the sensor data 112 using the computing device 102 (not shown) or some other image capture device, as the user 104 is moving around an object, such as the computer 302 that is sitting on the table. The images 110 and the sensor data 112 may be captured using the capture module 230 in the image application 106. In the current example, the user at times T1-T6 utilizes the device 102 to capture the images 110 as he/she is moving around the table.

As discussed above, the image application 106 may determine from the sensor data 112 that the user 104 has moved completely around the table while focusing on the object 302. In some configurations, the image application 106, using the image aligner 310, may align the images 110 such that the object 302 remains in alignment as the user 104 is walking around the table. In this way, the object 302 remains in the same position in the images 110 as they are played back on the device 102.

In some examples, a semi-transparent overlay of a previous image, or images, may be displayed to the user 104 for use in manually aligning the captured images 110. For example, the image aligner 310 may align the computer 302 in the images 110 such that the computer 302 is at the same level in each of the images 110. According to some configurations, the image aligner 310 may identify objects that are stationary or that have the least relative movement in the scene 105 in order to identify the object(s) to base the alignment on. In some examples, the image aligner 310 might use sensor data 112 that indicates a distance to an object(s) in a scene to identify the objects.

To playback the images 110, or a portion of the images 110, captured during the capture sequence 130C, the user 104 might move in a circle as indicated by the playback sequence 140D. The user 104 might move one direction to move backward in the sequence of the images 110 or in the other direction to move forward in the sequence of images 110 as illustrated by the playback sequence 140D. In some configurations, the user 104 might kneel (or move the device 102 lower) to view the computer 302 from a different angle.

In some configurations, the playback module 220 may remove other objects and content in the display that is not associated with the object that was focused on during the capture sequence. For example, the table displayed in the capture sequence 130 might be removed from the display 115 during the playback sequence 140D such that the user performing the playback may more closely examine the object focused on during the capture sequence 130C. According to some examples, the user might select whether to display the other content that was not focused on during the capture sequence 130C (e.g., using a user interface element or some other control).

Figure 4:
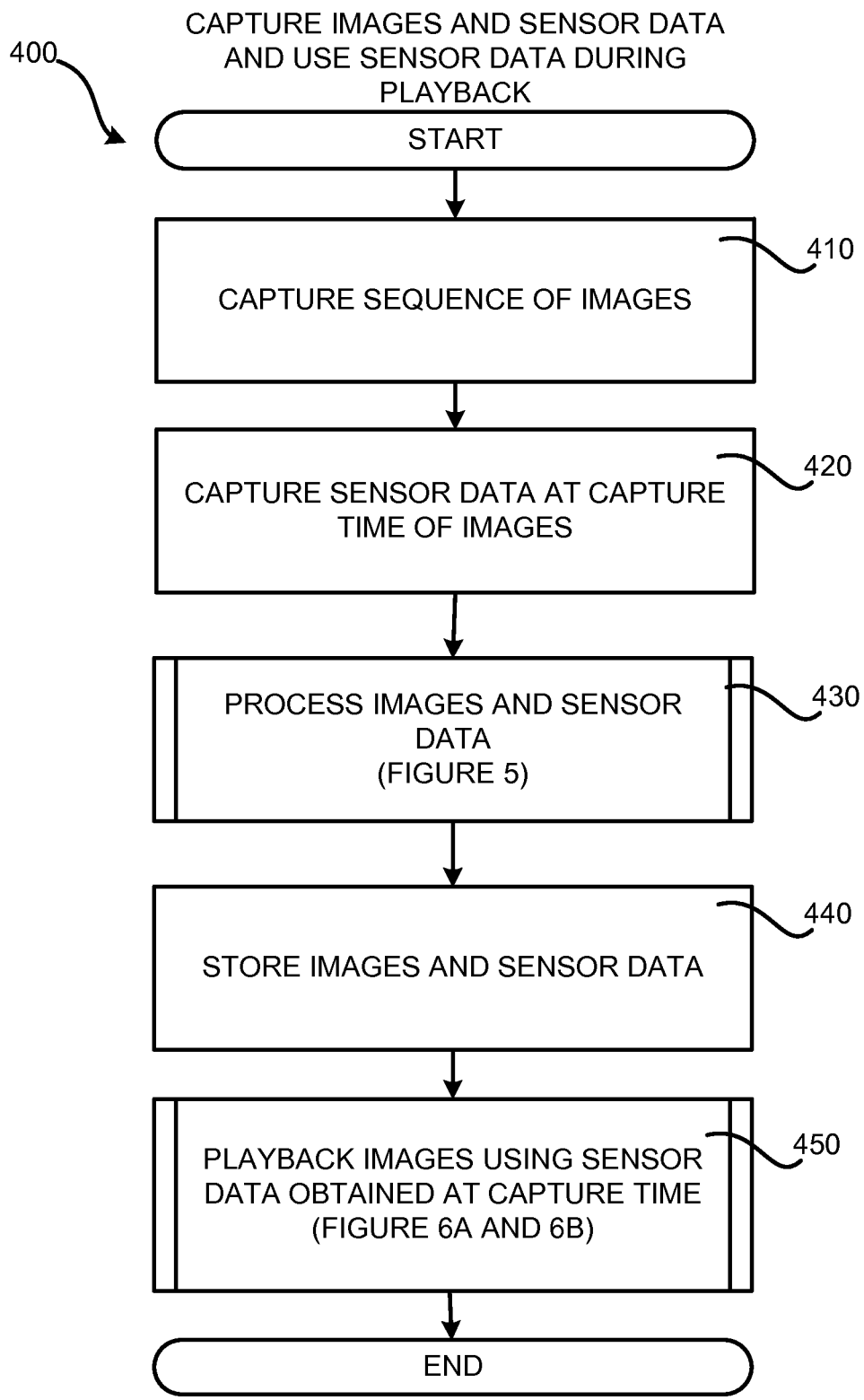
FIG. 4 is a flow diagram showing a routine illustrating aspects of a mechanism disclosed herein for capturing sensor data and a sequence of images and for playing back the images when current sensor data correlates to the captured sensor data.
Figure 5:
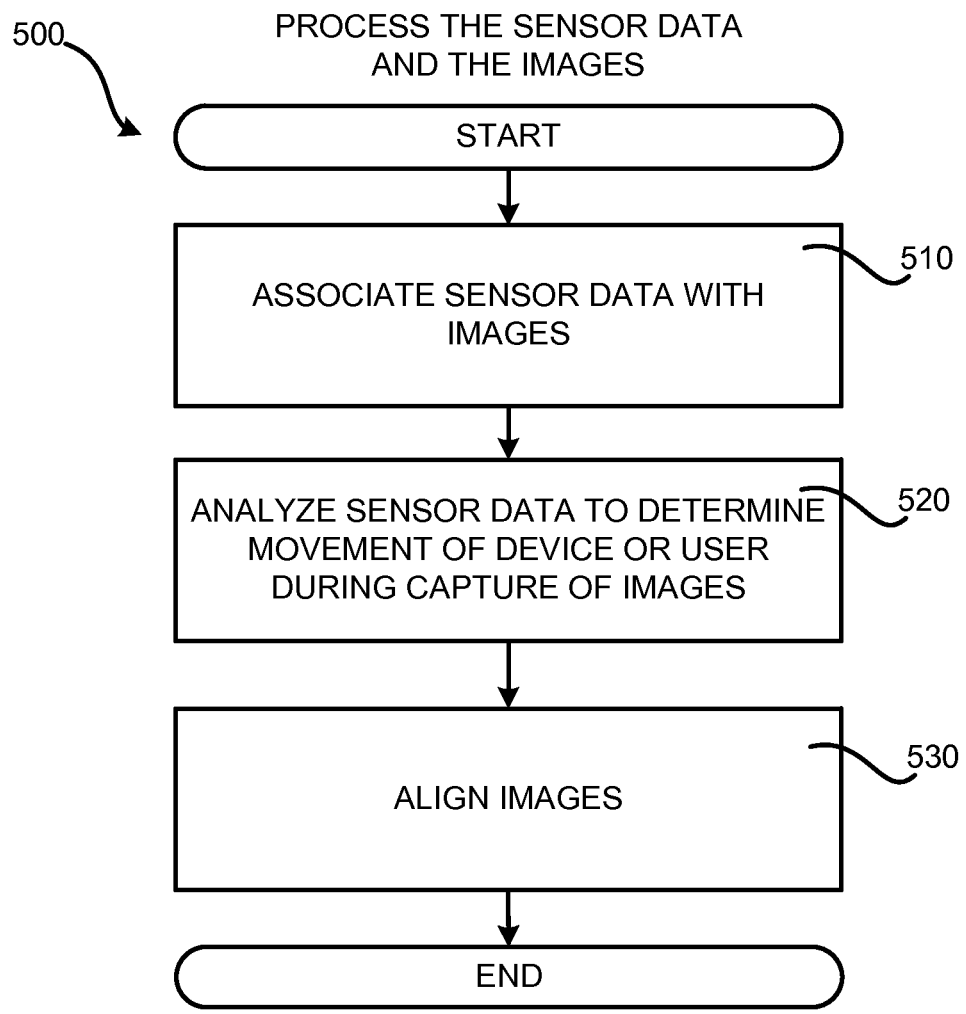
FIG. 5 is a flow diagram showing a routine illustrating aspects of a mechanism disclosed herein for processing sensor data and image data.

FIGS. 4-6 are flow diagrams showing routines that illustrate aspects of capturing a sequence of images and sensor data, and using the sensor data and current sensor data when playing back the images, according to an aspect disclosed herein. It should be appreciated that the logical operations described herein with respect to FIGS. 4-6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 4 is a flow diagram showing a routine 400 illustrating aspects of a mechanism disclosed herein for capturing sensor data 112 and a sequence of images 110, and for playing back the images 110 when current sensor data correlates to the captured sensor data 112. The routine 400 may begin at operation 410, where a sequence of images 110 may be captured. As discussed above, the sequence of images may be captured by the camera 120A, or some other image capture device or image capture devices. In some examples, the sequence of images might be obtained from the frames of a video or from single images captured in succession (e.g., a burst of images).

From operation 410, the routine 400 may proceed to operation 420, where the sensor data 112 is also captured at or around the capture time of the images 110. As discussed above, the sensor data 112 might be continuously captured during the capture time or the sensor data 112 might be obtained at the time each image is captured.

From operation 420, the routine 400 may proceed to operation 430, where the images 110 and the sensor data 112 may be processed. As discussed above, sensor data 120 that is captured during capture time might be associated with the sequence of images 110 obtained during operation 410. The sensor data 112 might be analyzed to determine movement of a device, such as the computing device 102, or the user 104 during the capture time of the sequence of the images 110. Additional details regarding processing of the images 110 and the sensor data 112 will be provided below with regard to FIG. 5.

From operation 430, the routine 400 may proceed to operation 440, where the images 110 and the sensor data 112 may be stored. In some examples, the images 110 and the sensor data 112 may be stored in the storage 108 on the computing device 102. In other examples, the images 110 and the sensor data 112 might be stored externally from the computing device 102 (e.g., in a network store). As discussed above, the images 110 and the sensor data 112 might be stored in the same file or in different files.

From operation 440, the routine 400 may proceed to operation 450, where playback of the sequence of the captured images may be performed. As discussed above, the playback module 220 of the image component 106 might be used to playback the images 110 on the display 115. In some examples, the playback of the images 110 is based at least in part on the sensor data 112 captured at the time the images 110 were captured. The playback of the images 110 may also be based, at least in part, on the sensor data 112 obtained during the capture of the images 110 and the current sensor data 112 that is obtained during the playback. Additional details regarding the playback of the images using the sensor data 112 will be provided below with regard to FIGS. 6A and 6B. From operation 450, the routine 400 may proceed to an end operation.

FIG. 5 is a flow diagram showing a routine 500 illustrating aspects of a mechanism disclosed herein for processing the sensor data 112 and the images 110. The routine 500 may begin at operation 510, where the sensor data 112 may be associated with the sequence of images 110. As discussed above, sensor data 112 that is captured at capture time may be associated with individual images 110 or a sequence of images 110. In some examples, the sensor data 112 may be stored with the metadata 114 that indicates the association between the sensor data and the image data.

From operation 510, the routine 500 may proceed to operation 520, where the sensor data 112 may be analyzed to determine any movement of the device 102 and/or the user 104 at or around capture time. For example, the different location points identified by the sensor data 112 might be used to calculate a path of the user 104 and/or the device 102 during the capture. Similarly, the orientation data might be used to determine that the device 102 was panning or tilting while taking one or more of the images 110 that are part of an image sequence. In some examples, the sensor data 112 may be used to change a number of images 110 to store in a particular time. As discussed above, more images 110 might be stored during a time the user or the image capture device is moving quickly, or a pulse of the user is high as compared to when the user or the image capture device is moving more slowly.

From operation 520, the routine 500 may proceed to operation 530, where the images 110 may be aligned. As discussed above, the images 110 might be aligned during capture time or at some point after capture time such that one or more objects that are in the image 110 are aligned from one image to a next image. For example, after two images 110 are aligned, the same object is located at the same or similar position within the two images 110. In another example, a relative location of the object might be used (e.g., maintain the object at the same relative vertical location within the image when the user is panning) Image stabilization, color leveling and/or other image processing mechanisms might also be performed. From operation 530, the routine 500 may proceed to an end operation.

Figure 6A:
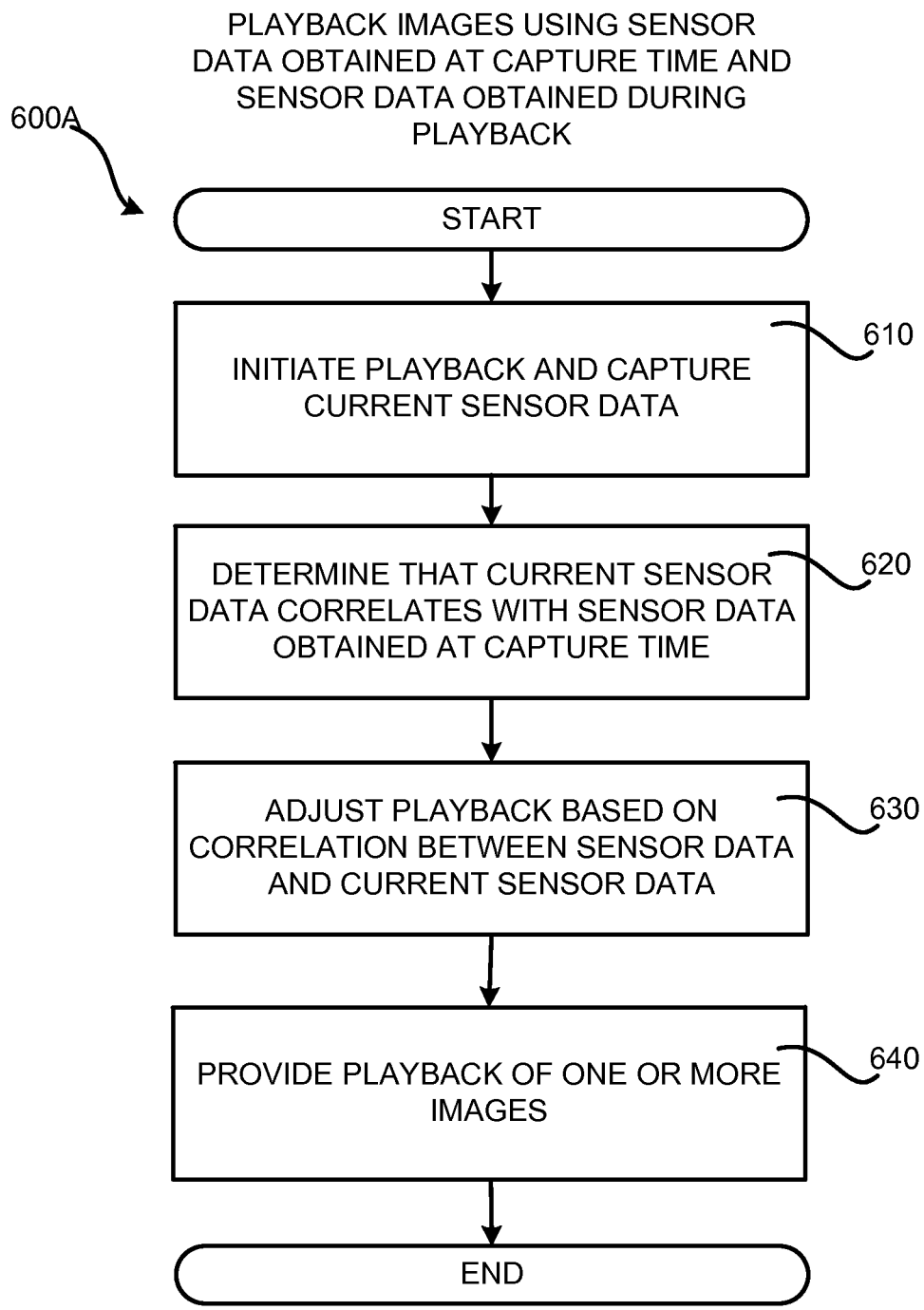
FIG. 6A is a flow diagram showing a routine illustrating aspects of a mechanism disclosed herein for adjusting playback of images based on a correlation of captured sensor data obtained at capture time and sensor data captured during playback.

FIG. 6A is a flow diagram showing a routine 600A illustrating aspects of a mechanism disclosed herein for adjusting playback of the images 110 based on a correlation of captured sensor data 112 obtained at the capture time and sensor data 112 captured during playback. The routine 600A may begin at operation 610, where the playback may be initiated and current sensor data 112 may be captured. As discussed above, the sensor data 112 that is captured during playback might be the same type of sensor data 112 that was captured when the sequence of images 110 were obtained.

From operation 610, the routine 600A may proceed to operation 620, where a determination may be made that the current sensor data 112 correlates with the sensor data 112 captured at the time of capture of the images. As discussed above, the image application 106 may determine that a movement of the device 120 or the user 104 that was identified from the sensor data 112 captured at the capture time correlates with the movement of the device 102 of the user 104 that was identified from the sensor data captured at the playback time.

From operation 620, the routine 600A may proceed to operation 630, where the playback may be adjusted based on the correlation. For example, the playback may be adjusted to move forward in the images 110, move backward in the images 110, zoom in on the images 110, pan the images 110, or the like depending on the current sensor data 112 as compared to the captured sensor data 112.

From operation 630, the routine 600A may proceed to operation 640, where the playback of one or more images may be provided. As discussed above, the playback might be displayed on a display, such as the display 115. As also discussed above, the display might be a display that is separate from the capture device. For example, the display might be associated with a set-top box, or some other device. In some examples, the images of the sequence are updated on the display 115 as the user 104 or the device 102 moves during the playback time and that movement correlates with the captured sensor data. From operation 640, the routine 600A may proceed to an end operation.

Figure 6B:
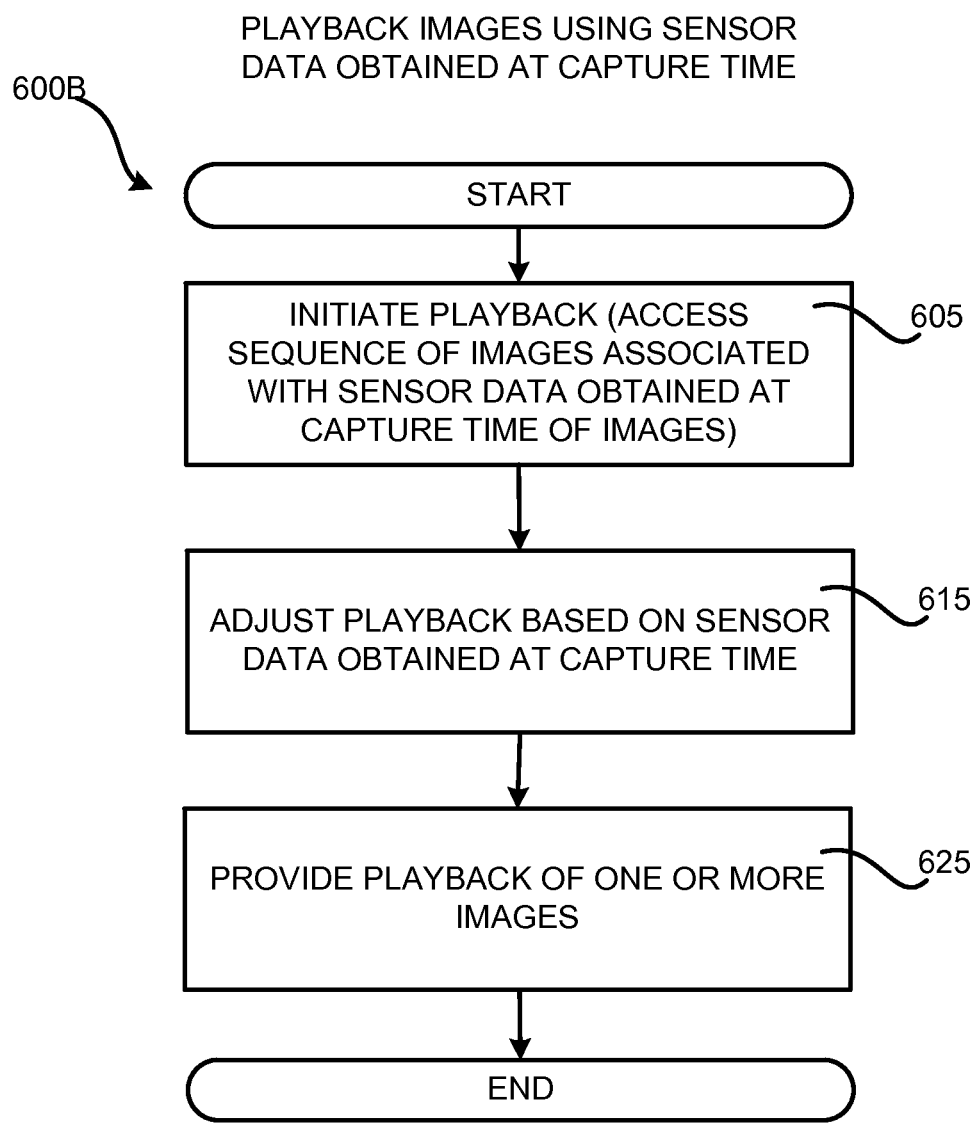
FIG. 6B is a flow diagram showing a routine illustrating aspects of a mechanism disclosed herein for adjusting playback of images based on captured sensor data obtained at capture time.

FIG. 6B is a flow diagram showing a routine 600B illustrating aspects of a mechanism disclosed herein for adjusting playback of the images 110 based on captured sensor data 112 obtained at the capture time. The routine 600B may begin at operation 605, where the playback may be initiated. As discussed above, a sequence of images 110 associated with sensor data 112 may be accessed. For example, the images 110 and associated sensor data 112 might be accessed from the storage 108, or some other storage. In some configurations, a user may access a recorded playback.

From operation 605, the routine 600B may proceed to operation 615, where the playback may be adjusted based on the sensor data obtained at capture time and possibly other sensor data. For example, the playback may be adjusted to move forward in the images 110, move backward in the images 110, zoom in on the images 110, pan the images 110, or the like depending on the captured sensor data 112. For example, the adjustment of the playback may include changing the display rate of the images based on a rate of movement of the user or the image capture device at the time the images were captured.

From operation 615, the routine 600B may proceed to operation 625, where the playback of one or more images may be provided. As discussed above, the playback might be displayed on a display, such as the display 115. As also discussed above, the display might be a display that is separate from the capture device. For example, the display might be associated with a set-top box, or some other device. From operation 625, the routine 600B may proceed to an end operation.

Figure 7:
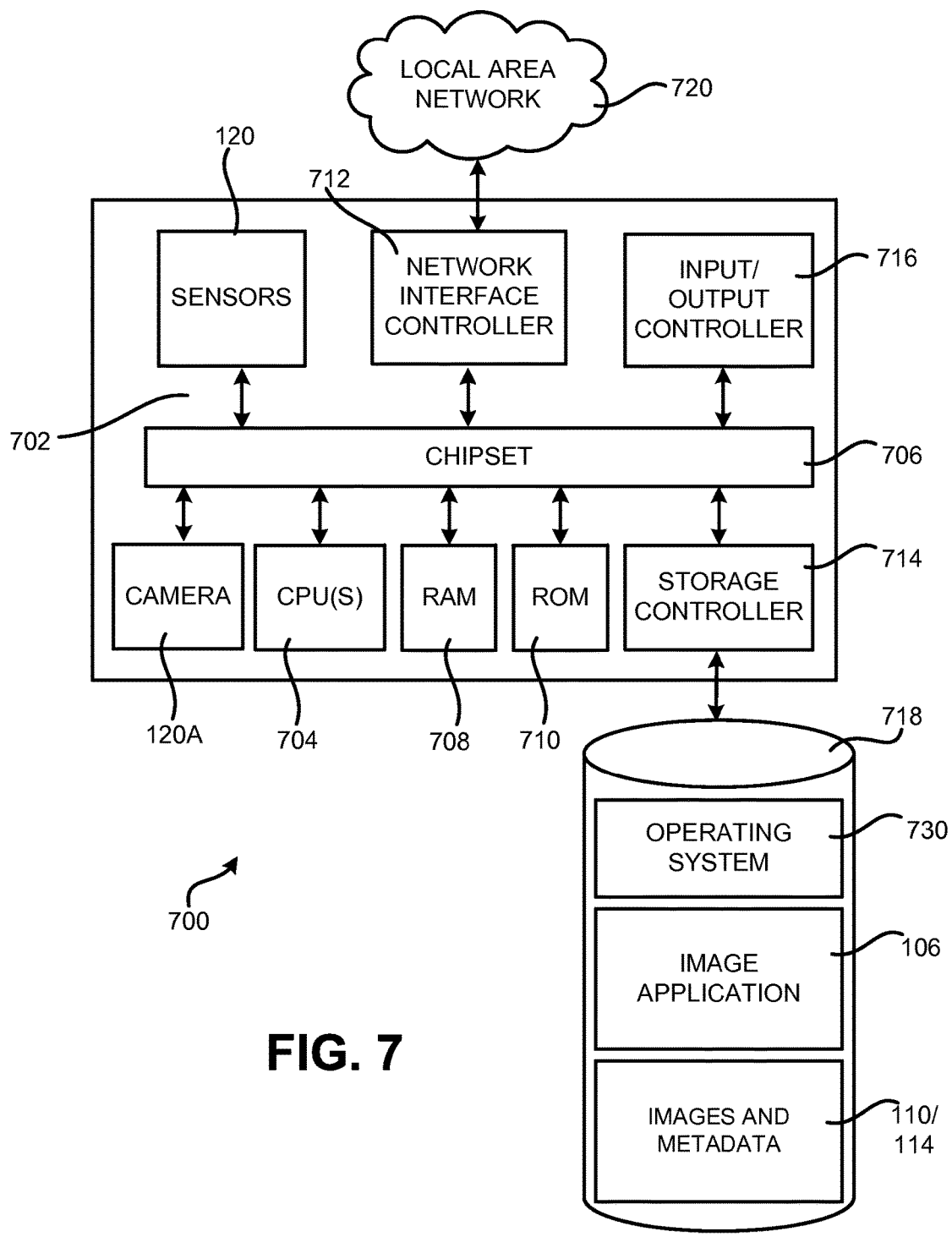
FIG. 7 is a computer architecture diagram showing an illustrative computer hardware architecture for implementing a computing device that might be utilized to implement aspects of the various technologies presented herein.

FIG. 7 shows an example computer architecture for a computer 700 capable of executing the program components described above for capturing images 110 and sensor data 112, and for using the sensor data 112 when playing back the images 110. The computer architecture shown in FIG. 7 illustrates a conventional server computer, workstation, desktop computer, laptop, tablet, network appliance, e-reader, digital cellular phone, or other computing device, and may be utilized to execute any aspects of the software components presented herein. For example, the computer architecture shown in FIG. 7 may be utilized to execute the image application 106 and/or store the images 110 and the metadata 114 shown in FIG. 1 and described above.

The computer 700 includes the camera 120A, the sensors 120, a baseboard 702, or "motherboard," which is a printed circuit board to which a multitude of components or devices may be connected by way of a system bus or other electrical communication paths. In one illustrative configuration, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the local area network 720. The chipset 706 might include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one configuration, the operating system comprises the ANDROID or LINUX or iOS operating system. According to another configuration, the operating system comprises the WINDOWS® operating system from MICROSOFT Corporation. According to further configurations, the operating system may comprise the UNIX operating systems. It should be appreciated that other operating systems may also be utilized. The mass storage device 718 may store other system or application programs and data utilized by the computer 700, such as the image application 106, the images 110 and the metadata 114, and/or any of the other software components and data described above. The mass storage device 718 might also store other programs and data not specifically identified herein.

In some examples, the mass storage device 718 or other computer-readable storage media is encoded with computer-executable instructions which, when loaded into the computer 700, transforms the computer from a general-purpose computing system into a special-purpose computer capable of implementing the technologies described herein. These computer-executable instructions transform the computer 700 by specifying how the CPUs 704 transition between states, as described above. According to some configurations, the computer 700 has access to computer-readable storage media storing computer-executable instructions which, when executed by the computer 700, perform the various routines described above with regard to FIGS. 4, 5 and 6. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for capturing images and sensor data, and for using the sensor data captured at the time of image capture and sensor data captured at a playback time to adjust the playback of the captured images. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   capture a sequence of images;
   capture first sensor data at a capture time of the sequence of images, the first sensor data indicating a first movement of an image capture device;
   associate the sequence of images with at least a portion of the first sensor data captured at the capture time of the sequence of images;
   store the sequence of images associated with the at least the portion of the first sensor data;
   capture second sensor data at a time of a playback of the sequence of images, the second sensor data indicating a second movement of the image capture device; and
   configure the playback of at least a first image and a second image of the sequence of images based at least in part on the second movement indicated by the second sensor data and the first movement indicated by the at least the portion of the first sensor data, wherein the playback includes displaying the first image followed by the second image based, at least in part, on a correlation between the first movement indicated by the at least the portion of first sensor data and the second movement indicated by the second sensor data.

2. The non-transitory computer-readable storage medium of claim 1, having further computer-executable instructions stored thereon that cause the computer to playback at least the first image and the second image of the sequence of images on a display at a rate based, at least in part, on the first sensor data.

3. The non-transitory computer-readable storage medium of claim 1, wherein to configure the playback of the at least the first image and the second image of the sequence of images comprises adjusting the playback based, at least in part, on the correlation, and wherein the adjusting includes moving forward in the sequence of images or moving backward in the sequence of images.

4. The non-transitory computer-readable storage medium of claim 1, wherein the first sensor data is continually captured during the capture time.

5. The non-transitory computer-readable storage medium of claim 1, wherein the first sensor data comprises one or more of a movement direction, a speed, or an acceleration of the image capture device.

6. An apparatus, comprising:
   one or more image capture devices;
   a display;
   one or more sensors configured to capture sensor data including one or more of environmental data, biological data associated with a user of the apparatus, or motion data that indicates a movement of the apparatus or the user;
   at least one processor; and
   a non-transitory computer-readable storage medium having instructions stored thereon which, when executed on the at least one processor, causes the apparatus to:
      capture, using the one or more image capture devices, images at a capture time;
      capture, using the one or more sensors, and at the capture time, first motion data indicating a first movement of the apparatus;
      associate at least a portion of the images with at least a portion of the first motion data captured at the capture time;
      store the at least the portion of the images and the at least the portion of the first motion data;

capture, using the one or more sensors, and at a time of playback of at least one image from the at least the portion of the images, second motion data indicating a second movement of the apparatus; and playback the at least one image on the display at the time of the playback based, at least in part, on the at least the portion the first motion data and the second motion data, and on a correlation between the first movement of the apparatus and the second movement of the apparatus.

7. The apparatus of claim 6, wherein to capture the images comprises changing a frame rate of at least one of the one or more image capture devices at the capture time based, at least in part, on the first motion data.

8. The apparatus of claim 6, wherein the computer-readable storage medium has further computer-executable instructions stored thereon which, when executed on the at least one processor, cause the apparatus to capture, at the capture time, a heart rate of the user.

9. The apparatus of claim 6, wherein the first motion data captured at the capture time comprises one or more of a movement direction, a speed, or an acceleration of the apparatus.

10. The apparatus of claim 6, wherein the first motion data is continually captured during the capture time of the images.

11. The apparatus of claim 6, wherein the computer-readable storage medium has further computer-executable instructions stored thereon which, when executed on the at least one processor, cause the apparatus to align a position of an object within at least a portion of the images.

12. The apparatus of claim 6, wherein to playback the at least one image comprises at least:

moving forward in the playback based, at least in part, on the second motion data indicating the second movement of the apparatus in a first direction; and moving backward in the playback based, at least in part, on the second motion data indicating the second movement of the apparatus in a second direction.

13. The apparatus of claim 6, wherein the computer-readable storage medium has further computer-executable instructions stored thereon which, when executed on the at least one processor, cause the apparatus to use data associated with a previous playback of the at least one image to determine one or more images from the images to display.

14. A computer-implemented method, the computer-implemented method comprising:

accessing, by an electronic device, a sequence of images associated with sensor data captured at a capture time of the sequence of images, the sensor data indicating a first movement during the capture time;

capturing, by the electronic device, second sensor data during a time of a playback of the sequence of images, the second sensor data indicating a second movement;

determining, by the electronic device, a correlation between the first movement indicated by the first sensor data captured during the capture time and the second movement indicated by the second sensor data; and adjusting, by the electronic device, the playback of the sequence of images on a display based, at least in part, on the correlation, wherein the adjusting includes moving forward in the sequence of images or moving backward in the sequence of images.

15. The computer-implemented method of claim 14, wherein the first sensor data captured at the capture time further indicates a heart rate of a user.

16. The computer-implemented method of claim 14, wherein determining the correlation comprises determining that the second movement of a playback device correlates to the first movement of an image capture device utilized to capture the sequence of images at the capture time.

17. The computer-implemented method of claim 14, further comprising capturing a head position of a user relative to the display during the time of the playback of the sequence of images.

18. The computer-implemented method of claim 14, further comprising using data associated with a previous playback of the sequence of images to determine one or more images from the sequence of images to display.

19. The computer-implemented method of claim 14, wherein the sensor data captured at the capture time includes one or more of a movement direction, a speed, or an acceleration of the electronic device.

20. The computer-implemented method of claim 14, further comprising aligning a position of an object within at least a portion of the sequences of images.

* * * * *